Sept. 25, 1945.  R. A. NIEKAMP  2,385,369
SHAFT COUPLING
Filed June 28, 1940

Inventor
Richard A. Niekamp
By L. L. Walker
Attorney

Patented Sept. 25, 1945

2,385,369

UNITED STATES PATENT OFFICE 2,385,369

SHAFT COUPLING

Richard A. Niekamp, Dayton, Ohio, assignor to The Master Electric Company, Dayton, Ohio, a corporation of Ohio Application June 28, 1940, Serial No. 343,013

3 Claims. (Cl. 64—11)

This invention pertains to shaft couplings, and more particularly to a close coupled resilient power transmission assembly.

To interpose a conventional resilient drive unit intermediate a driving and driven mechanism necessitates a greater installation space than may be available. By the present arrangement, such difficulty is overcome and the overall length of the intercoupled units is minimized. This is effected by disposing the adjacent ends of the aligned shafts of the respective units in approximate abutting relation and providing a bearing for the shaft of one unit in the structure of the complementary unit, and disposing a resilient body, subjected only to torsional strains within the length of one of the shafts and concentric thereto.

The object of the invention is to improve the construction as well as the means and mode of operation of shaft couplings and power transmission connections, whereby they may not only be economically manufactured, but will be more efficient in use, uniform in operation, and unlikely to get out of repair.

A further object of the invention is to provide a power transmission unit which will enable compact assembly of driving and driven mechanisms, and which will occupy minimum lineal space therein.

A further object of the invention is to provide a resilient drive connection which will readily absorb differential starting strains and shock and will compensate power impulses and ununiform acceleration of the driving unit.

A further object of the invention is to provide an improved self-aligning connection between the respective driving and driven units.

A further object of the invention is to provide an improved form of resilient motion transmitting element.

A further object of the invention is to provide a close coupled resilient drive connection embodying the advantageous structural features and inherent meritorious characteristics herein mentioned.

With the above primary and other incidental objects in view as will more fully appear in the specification, the invention intended to be protected by Letters Patent consists of the features of construction, the parts and combinations thereof, and the mode of operation, or their equivalents, as hereinafter described or illustrated in the accompanying drawing.

In the accompanying drawing, wherein is illustrated the preferred, but obviously not necessarily the only form of embodiment of the invention, Fig. 1 is a side elevation partly in section of a driving and a driven unit intercoupled by a resilient drive assembly embodying the present invention.

Like parts are indicated by similar characters of reference throughout the several views.

Figure 1:
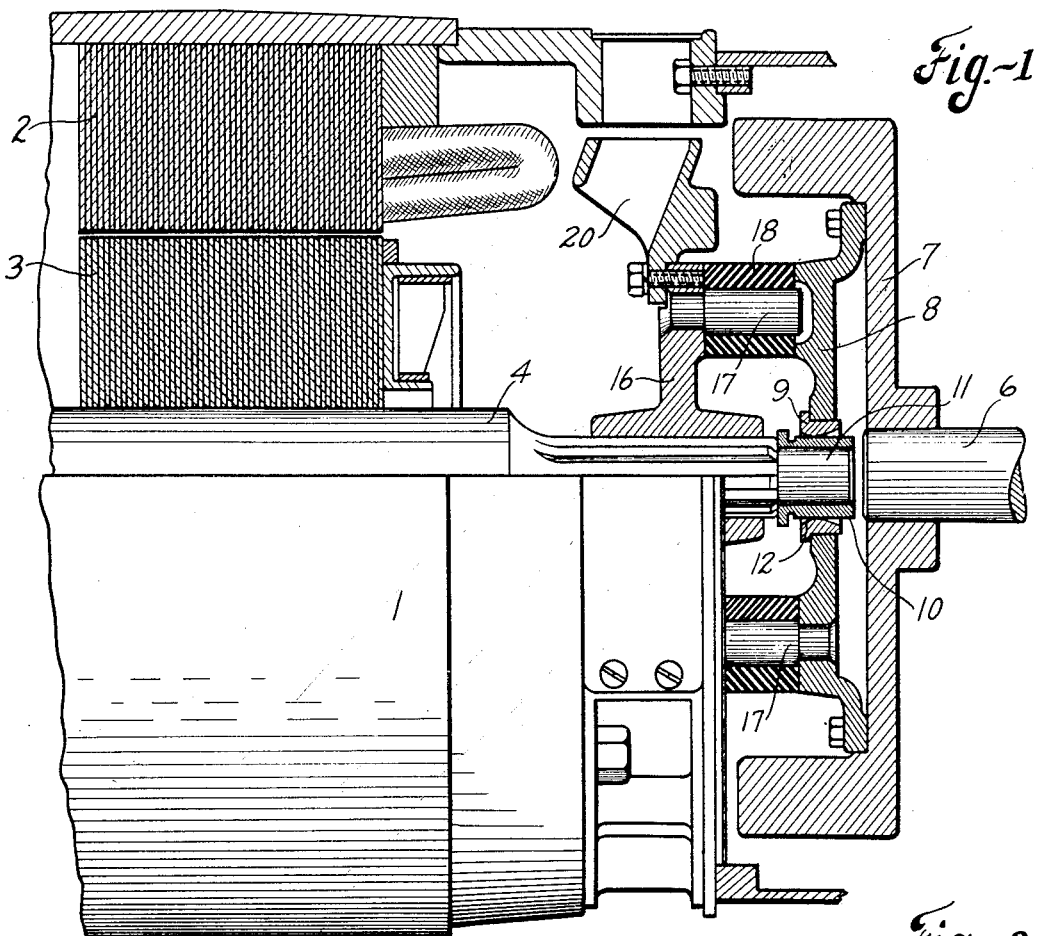
Figure 2:
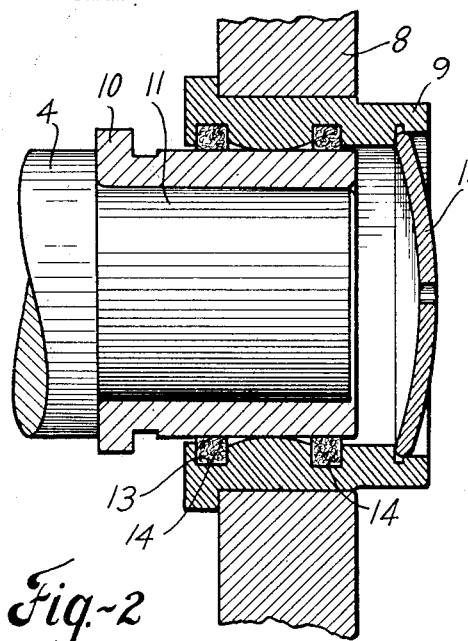
Fig. 2 is an enlarged detail sectional view of a shaft mounting forming a part of the assembly.
Figure 3:
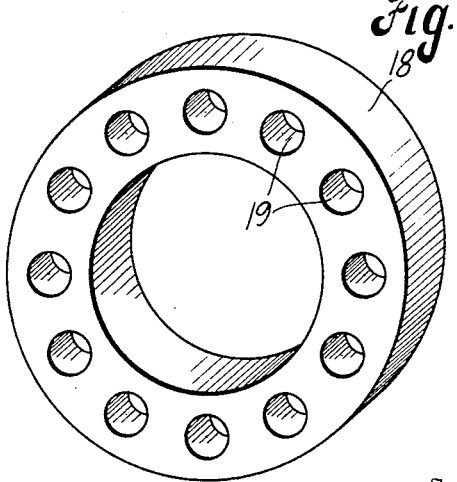
Fig. 3 is a perspective view of the resilient drive element removed from the assembly.

For illustrative purposes, but with no intent to unduly limit the application or restrict the scope of the invention, it is herein shown and described as applied to the intercoupling of an explosive engine with an electrical generator.

In the drawing, 1 indicates an electric generator, of which 2 is the stator and 3 the rotor mounted on a rotor shaft 4. The shaft 4 of the driven unit, in this case the generator 1, is directly connected for unison rotation with the shaft 6 of a driving unit, such as an internal combustion engine (not shown), on which is carried a conventional fly wheel 7.

Secured to the face of the fly wheel 7 of the driving unit is a spider or driving head 8. A central bushing or collar 9 is mounted in the drive head 8 concentrically with the shaft 6 and supports for limited wobble motion a bearing sleeve 10, which receives the reduced end or pilot 11 of the shaft 4 of the driven unit.

The interior of the bushing or collar 9 is formed with an internal convex surface 12 in which the peripheral surface of the bearing sleeve engages for relative rocking or askew movement. The collar 9 is preferably, but not necessarily, provided with internal spaced annular grooves 13 in which are seated gaskets 14 of suitable packing material. The extremity of the collar or bushing 9 is also preferably counterbored or shouldered to receive a spring disc closure 15. The closure disc 15 and packing rings 14 serve to retain an ample quantity of lubricant within the bearing structure.

By supporting the end 11 of the driven unit shaft 4 in a bearing carried by the driving unit, the two shafts 4 and 6 are disposed in quite close terminal relation, almost but not quite abutting one on the other. This minimizes the overall lineal extent of the intercoupled units.

For transmitting rotary motion from one shaft to the other, there is provided on the shaft 4 a driven head or spider 16 in parallel spaced relation with the driving head 8 carried by the shaft 8. Positioned in the heads 8 and 16 at circumferentially spaced intervals are two series of pins 17 projecting from the respective heads in overlapping relation. The pins carried by one head alternate with those carried by the opposing head. Interposed between the opposing relatively spaced drive heads 8 and 16 is a ring 18 of rubber or other resilient material having therein an annular series of spaced holes 19 in which the respective sets of pins 17 engage.

The pins 17 are mounted in the heads at one end only and project thence through the holes in the ring 18 with their ends free therebeyond in proximate relation with the opposite head. The pins of each head alternating with those of the opposite head project in opposite directions through the ring 18. The resilient ring 18 is subjected to torsional strain only. It has no function whatever in maintaining relative alignment of the shafts of the driving and driven units. The alignment is maintained by the bearing of the driven shaft 4 in the head 8 of the driving unit. The bearing sleeve 10 is capable of sufficient movement to enable the bearing to be self-aligning and to compensate for any slight inaccuracy in the setting of the units. Such direct connection, however, relieves the annular resilient element 18 of all strain other than the torsional driving action. Resilient ring 18 not only transmits the motion from one unit to the other, but it also absorbs the shocks and compensates for irregularity incident to intermittent engine explosions, thereby equalizing the driving action to the generator or other driven mechanism.

In the present instance, the driven head 16 is further utilized to mount a fan ring 20 by which air is circulated through the generator.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described my invention, I claim:

1. A power transmission assembly, of the type wherein a resilient coupling interconnects the shafts for unison rotation and against the yielding resistance of which the shafts are capable of limited differential adjustment, including a universal coupling for the shafts additional to said resilient coupling, characterized by a mount carried by one of the shafts having an oppositely flaring bore, a bearing sleeve for the other of said shafts positioned within the oppositely flaring bore, relatively spaced annular grooves in one of the contiguous faces of said bearing sleeve and mount, packing rings seated in said annular grooves and bearing on the other of said members and a closure disc located beyond the end of the shaft in one end of the oppositely flaring bore of the mount.

2. In a motor generator assembly, a motor drive shaft and a generator rotor shaft disposed end to end in substantially aligned relation, a flywheel secured to the motor shaft, a fan unit within the generator secured to the rotor shaft, a concentrically disposed spider carried by the flywheel in axially spaced parallel relation with the fan and in relatively spaced relation to the drive shaft, having a central opening into which the end of the rotor shaft projects, a resilient body intermediate the spider and the fan unit, and means interconnecting the spider and fan with the resilient body at alternating circumferential spaced intervals, the construction and arrangement being such that the rotor shaft is supported within the spider for limited angular adjustment independently of the resilient coupling whereby the latter is subjected to torsional strain only.

3. In a motor generator assembly, a motor drive shaft and a generator rotor shaft disposed end to end in substantially aligned relation, a flywheel secured to the motor shaft, a fan unit within the generator secured to the rotor shaft, a concentrically disposed spider carried by the flywheel offset in relatively spaced relation to the end of the drive shaft, shaft aligning and supporting means carried by the spider for receiving the opposed end of the rotor shaft and permitting limited angular adjustment thereof, a resilient ring interposed between the arbor and the fan, and means for operatively connecting the arbor and the fan respectively with the intermediate resilient ring, the construction and arrangement being such that the arbor, resilient ring and fan are within the lineal extent of the rotor shaft and in progressively increasing spaced relation to the adjacent ends of the two shafts.

RICHARD A. NIEKAMP.